(12) United States Patent
Aruga et al.

(10) Patent No.: US 6,429,896 B1
(45) Date of Patent: *Aug. 6, 2002

(54) DIGITAL CAMERA AND EXTERNAL DEVICE FOR IMAGE STORAGE AND CAMERA CONTROL

(75) Inventors: Urato Aruga; Kazuki Itoh, both of Suwa (JP)

(73) Assignee: Chinon Kabushiki Kaisha, Nagano (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,159

(22) Filed: Jan. 30, 1997

(30) Foreign Application Priority Data

Feb. 21, 1996 (JP) .............................................. 8-033852

(51) Int. Cl.[7] .................................................. H04N 5/76
(52) U.S. Cl. ........................ 348/233; 348/231; 348/552
(58) Field of Search ................................ 348/333, 231, 348/233, 373, 552, 333.01, 333.02, 333.05

(56) References Cited

U.S. PATENT DOCUMENTS

| | | | | |
|---|---|---|---|---|
| 5,138,459 A | * | 8/1992 | Roberts et al. ............. | 348/232 |
| 5,283,662 A | * | 2/1994 | Nakajima .................... | 347/250 |
| 5,402,170 A | * | 3/1995 | Parulski et al. ............. | 348/211 |
| 5,440,401 A | * | 8/1995 | Parulski et al. ............. | 386/124 |
| 5,452,180 A | * | 9/1995 | Register et al. ............. | 361/686 |
| 5,477,264 A | * | 12/1995 | Sarbadhikari et al. ...... | 348/231 |
| 5,479,206 A | * | 12/1995 | Ueno et al. .................. | 348/211 |
| 5,490,792 A | * | 2/1996 | Sugita ......................... | 439/159 |
| 5,493,335 A | * | 2/1996 | Parulski et al. ............. | 348/233 |
| 5,506,617 A | * | 4/1996 | Parulski et al. ............. | 348/207 |
| 5,535,011 A | * | 7/1996 | Yamagami et al. .......... | 386/117 |
| 5,557,358 A | * | 9/1996 | Mukai et al. ................ | 396/296 |
| 5,666,159 A | * | 9/1997 | Parulski et al. ............. | 348/211 |
| 5,729,289 A | * | 3/1998 | Etoh ............................ | 348/333 |
| 5,754,227 A | * | 5/1998 | Fukuoka ..................... | 348/232 |
| 5,829,014 A | * | 10/1998 | Hayashi ...................... | 711/103 |
| 6,011,764 A | * | 1/2000 | Itami et al. .................. | 369/58 |
| 6,020,982 A | * | 2/2000 | Yamauchi et al. .......... | 358/444 |

* cited by examiner

Primary Examiner—Wendy R. Garber
Assistant Examiner—Mitchell White
(74) Attorney, Agent, or Firm—Oppenheimer Wolff & Donnelly, LLP

(57) ABSTRACT

This patent discloses a digital camera and an external device for both storing digital images from the camera and controlling certain camera functions. The external device may be either directly attached to the camera or remotely attached by way of a cable or similar device. The external device may also include a means for recording images onto removable recording media. The external device may also include a button for sending instructions to the camera to allow for switching between image resolution modes, flash lighting modes, and autofocusing modes.

3 Claims, 7 Drawing Sheets

DIGITAL CAMERA AND EXTERNAL DEVICE FOR IMAGE STORAGE AND CAMERA CONTROL

BACKGROUND OF THE INVENTION

1. Field of the Invention

The present invention relates to a digital camera such as electronic still camera, an external storage device for externally storing the image data within this digital camera, and a system made of them, and, in particular, to an external storage device which can set operational functions of the digital camera from the outside.

2. Related Background Art

Electronic still camera is an apparatus which captures an image of a subject by using a solid-state imaging device such as CCD. An analog signal output from the solid-state imaging device is AD-converted and, after being subjected to a predetermined processing, stored in a main memory within the electronic still camera. The main memory is constituted by a semiconductor non-volatile memory such as $E^2PROM$.

SUMMARY OF THE INVENTION

The number of $E^2PROMs$ which can be installed within an electronic still camera, however, is restricted by the size of the housing of the camera. Accordingly, in order to record or keep a larger number of images, external storage devices which are to be connected to the electronic still camera by way of a cable have been developed. While the conventional external storage device has only a function of recording and reproducing image data, functional setting of the camera is effected on the camera side. In an electronic still camera using an LCD, information about functional settings of the camera is displayed on the LCD, so as to provide users with necessary information. Nevertheless, as various kinds of information are displayed on the same LCD attached to the electronic still camera, it is difficult for users who are not accustomed to electronic instruments to discern such information.

The present invention relates to a digital camera such as electronic still camera, an external storage device connected to this digital camera by way of a cable or the like, and a system made of them.

The digital camera in accordance with the present invention comprises a solid-state imaging device which captures an image of a subject; a first storage device which stores, selectively with a first or second resolution, image data of the subject output from the solid-state imaging device; a second storage device which stores a program including an instruction for switching, according to an order from outside of the digital camera, the resolution of the image data stored in the first storage device; a first control section which executes the program stored in the second storage device; and a terminal to which the order from the outside is input.

An external storage device connected to the terminal of this digital camera comprises a housing; a liquid crystal display attached to one side face of the housing; and a second control section which orders, by way of the terminal, the digital camera to rewrite the instruction and causes the liquid crystal display to show information about the resolution of the digital camera.

Further, in a system constituted by a digital camera and an external storage device, the digital camera comprises a first housing; a solid-state imaging device which is disposed within the first housing and captures an image of a subject; a first storage device which is disposed within the first housing and temporarily stores image data of the subject; a second storage device which is disposed within the first housing; and a first control section which is disposed within the first housing, reads out the image data stored in the first storage device, and converts the image data according a predetermined instruction so as to write thus converted data into the second storage device. Also, this external storage device comprises a second housing having an opening into which a recording medium to store the image data is inserted; a terminal attached to the second housing; and a second control section which is disposed within the second housing, reads out, by way of the terminal, the image data stored in the second storage device of the digital camera, writes thus read-out data into the recording medium, and transmits a control signal for changing the predetermined instruction to the first control section of the digital camera by way of the terminal.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the present invention will be explained. In the following explanation, constituents identical to each other will be referred to with marks identical to each other, without their overlapping explanations repeated.

Figure 1:
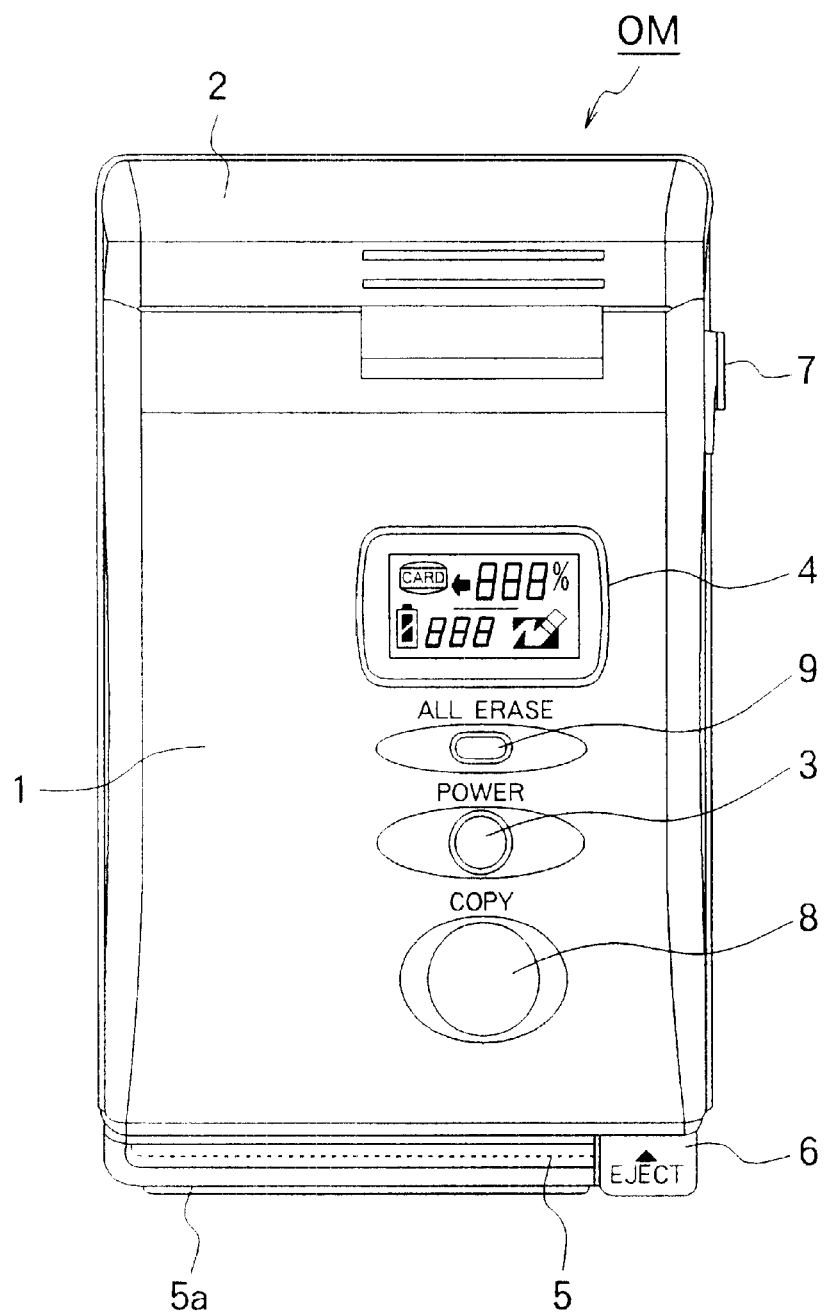
FIG. 1 is a plan view of an external storage device.

FIG. 1 is a plan view of an external storage device OM. An end portion of a housing 1 forms a battery box 2. When a battery is placed within this battery box 2, and a power switch button 3 is then pushed down, the external storage device OM is actuated, thereby lighting a liquid crystal display (LCD) 4 attached to the same face of the housing 1 on which the button 3 is located. The LCD 4 shows the numbers of photographed shots within a camera and within a memory card (recording medium) 5, whether or not the recording medium is attached, the battery voltage, and the like. FIG. 1 shows a state where the LCD 4 is totally lighted. In the following explanation, the face of the housing 1 on which the LCD 4 is disposed will be referred to as upper face.

At the front face of the housing 1, disposed is an opening 5a through which the memory card 5 is inserted into the front face of the housing 1 in parallel thereto. When pushed into the housing 1 by way of this opening 5a, the memory card 5 is stabilized with respect to the housing 1. At the front face of the housing 1, disposed is an eject button 6 which is protruded in a direction in parallel to the upper face of the housing 1. When the eject button 6 is urged toward the inside of the housing 1, the locking mechanism of the memory card 5 which has been inserted into the housing 1 is released, so that the memory card 5 can be taken out from the inside of the housing 1.

As will be explained later, the memory card 5 stores image data within a digital camera to which the external storage device OM is connected. The external storage device OM is connected to the digital camera by way of a terminal 7. When a copy switch button 8 is pushed down, the image data within the digital camera can be transferred into the memory card 5. Also, when an erase switch button 9 is pushed down, the image data stored within the memory card 5 are erased.

Figure 2:
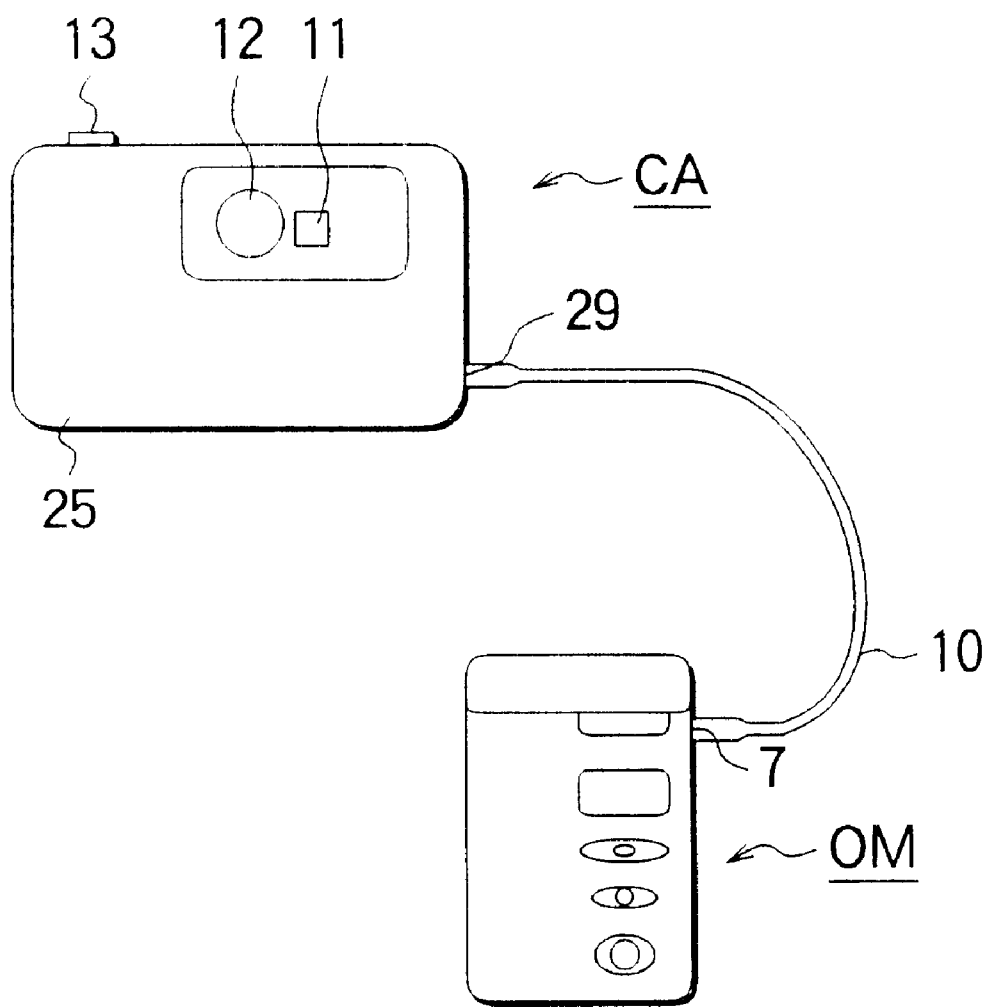
FIG. 2 is an explanatory view of a camera system constituted by an external storage device and a digital camera.

FIG. 2 shows a camera system constituted by a digital camera CA and the external storage device OM. The terminal 7 of the external storage device OM is connected to the digital camera CA by way of a cable 10. Here, the digital camera CA and the external storage device OM are connected to each other through a serial interface. The digital camera CA comprises a finder 11, a photographing lens 12, and a shutter release button 13 which are attached to a housing 25, as well as a storage device therewithin which stores image data of a subject which has formed an image incident on the inside of the digital camera CA by way of the photographing lens 12.

Figure 3:
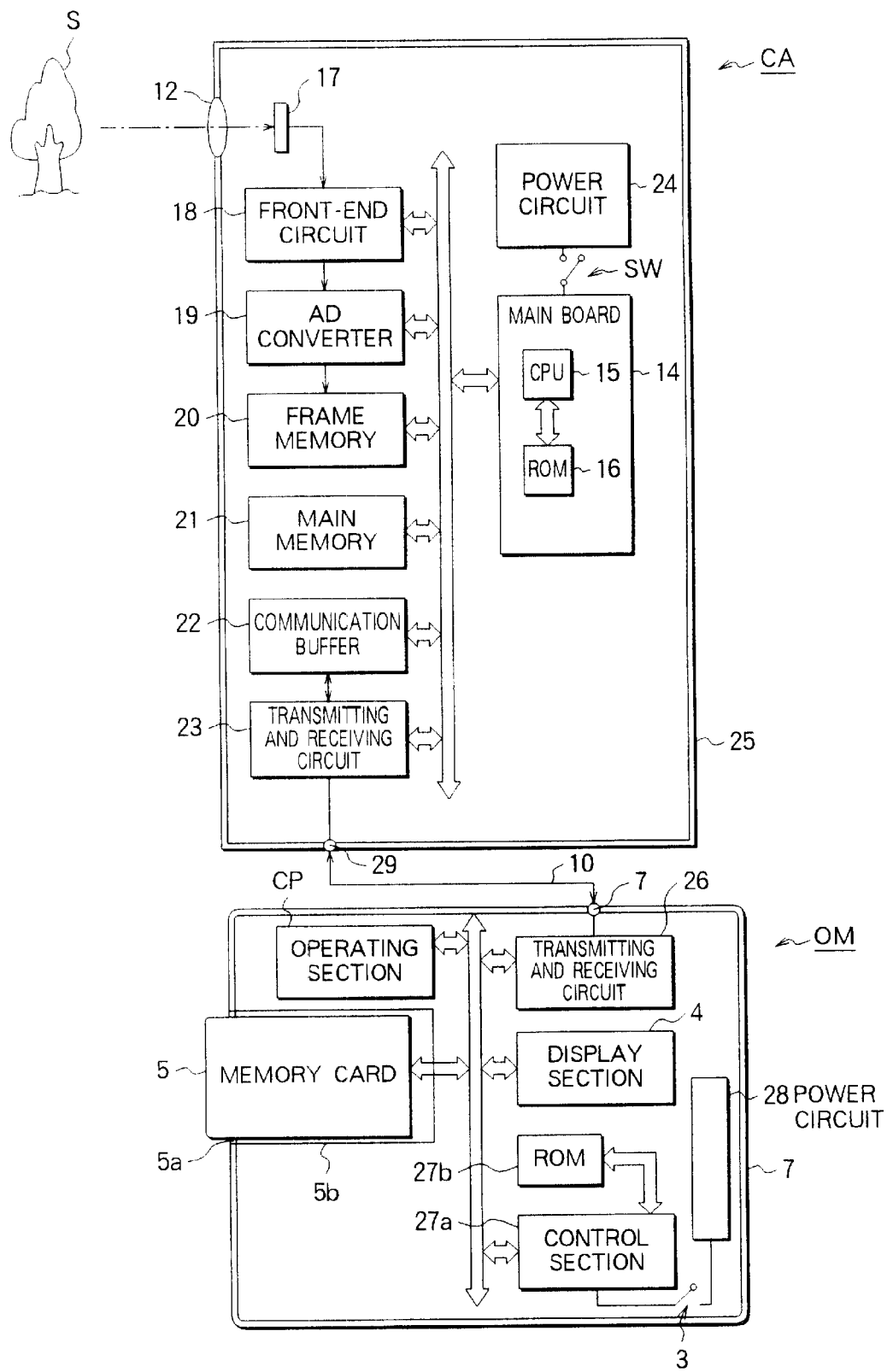
FIG. 3 is a block diagram showing a configuration of a camera system.

FIG. 3 is a block diagram showing a camera system constituted by the digital camera CA and the external storage device OM.

The digital camera CA is controlled by a control unit 14 constituted by a main board. Namely, the control unit 14 is a microcomputer unit comprising a central processing unit (CPU) 15, which is a control section for executing an operation, and a read-only memory (ROM) 16 which stores a program used at the time when the CPU is actuated and the like. Namely, the control section 15 executes the program written into the ROM 16. The unit is actuated when a switch SW is turned on so as to supply an electric power from a power circuit 24 to the main board 14.

Light reflected by a subject S is transmitted through the photographing lens 12 so that it can be made incident on a single-plate color CCD image sensor 17. Namely, the subject S forms an image on a light-receiving surface of the image sensor 17. Here, the image sensor 17 includes a CCD (solid-state imaging device), which comprises a plurality of pixels arranged two-dimensionally, and a circuit for applying a transfer clock to each pixel. As the CCD, that used for VTR is employed.

A CCD output signal from the image sensor 17 is converted into a video signal by a front-end circuit 18 including an amplifier circuit and a sample holding circuit, and thus obtained video signal is converted into a quantized digital signal by an AD converter 19.

The video signal is directly AD-converted by the AD converter 19 and stored in a frame memory (storage device) 20 which can accumulate image data for at least one picture. The frame memory 20 is controlled by the control unit 14. The frame memory 20 is a so-called PSRAM. which apparently functions as static random access memory (SRAM). A main memory 21 is also disposed within the housing 25. The main memory 21 is a non-volatile memory which enables both readout and writing and, more specifically, is an electrically erasable programmable ROM ($E^2$PROM) which can erase the voltage at its floating gate when a voltage is applied to its control gate.

The image data temporarily stored in the frame memory 20 are written into the main memory (storage device) 21 according to an order from the control section 15. Namely, according to the instruction stored within the ROM 16, the control section 15 reads out the image data stored in the frame memory 20, converts thus read-out image data, and writes thus converted data into the main memory 21. This writing operation has two modes. One of them is a high-resolution mode in which high-resolution image data temporarily stored in the frame memory 20 are read out and all of thus read-out data are written into the main memory 21. The other is a low-resolution mode in which the high-resolution image data temporarily stored in the frame memory 20 are read out and then thus read-out image data are written into the main memory 21, while a part thereof is skipped, such that the amount of data becomes ½ of the high-resolution image data. Namely, under the low-resolution mode, image data twice as large as those of the high-resolution image data can be stored in the same capacity (available space) of memory. These modes can be switched therebetween as the instruction within the ROM 16 is rewritten according to an order from the external storage device OM. Namely, the program stored within the ROM 16 of the digital camera CA includes an instruction for setting the operational outline of the system, and this instruction further includes therewithin an instruction for switching, according to the order from the outside of the digital camera, the resolutions of the image data to be stored in the main memory 21. Here, at the time of this writing operation, the image data stored in the frame memory may be written into the main memory as being compressed.

The image data stored in the main memory 21 are copied or transferred to the recording medium 5 within the external storage device OM by way of a transmitting and receiving circuit 23 of the digital camera CA and a transmitting and receiving circuit 26 of the external storage device OM. The image data being transmitted are temporarily accumulated in a communication buffer 22 from the main memory 21 by the control section 15, and then sequentially transferred to the transmitting circuit 23, from which they are transferred to the external storage device OM by way of terminals 29 and 7. The data being received are temporarily stored in the communication buffer 22 by way of the receiving circuit 23 and then sequentially read out by the control section 15.

The external storage device OM is controlled by a control section 27a which is a CPU or the like. The instruction to be executed by the control section 27a is stored in a ROM 27b. In FIG. 3, an operating section CP is assumed to include the buttons 8 and 9 in FIG. 1.

Figure 8:
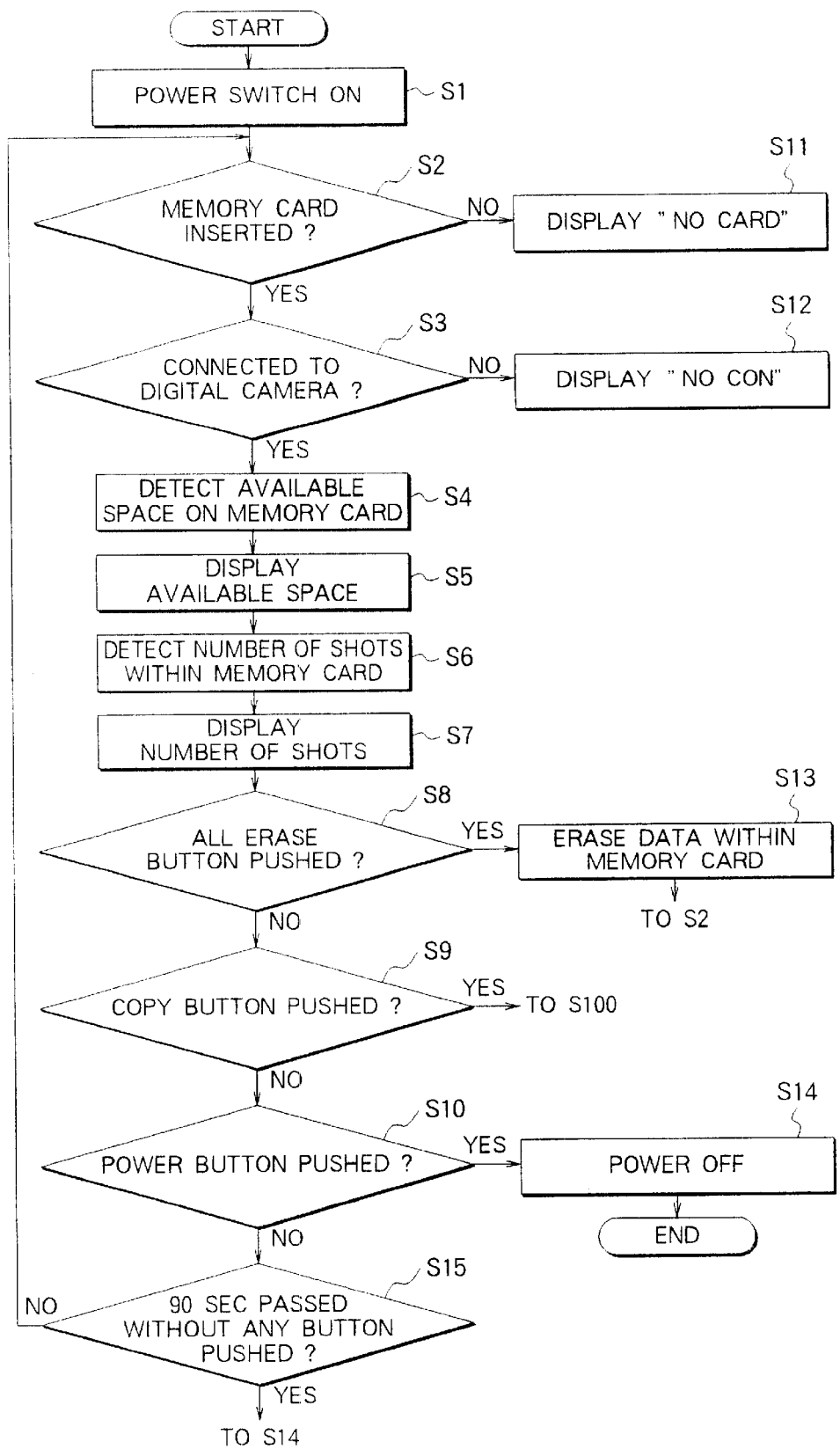
FIGS. 8 to 10 are flow charts for explaining operations of an external storage device.
Figure 9:
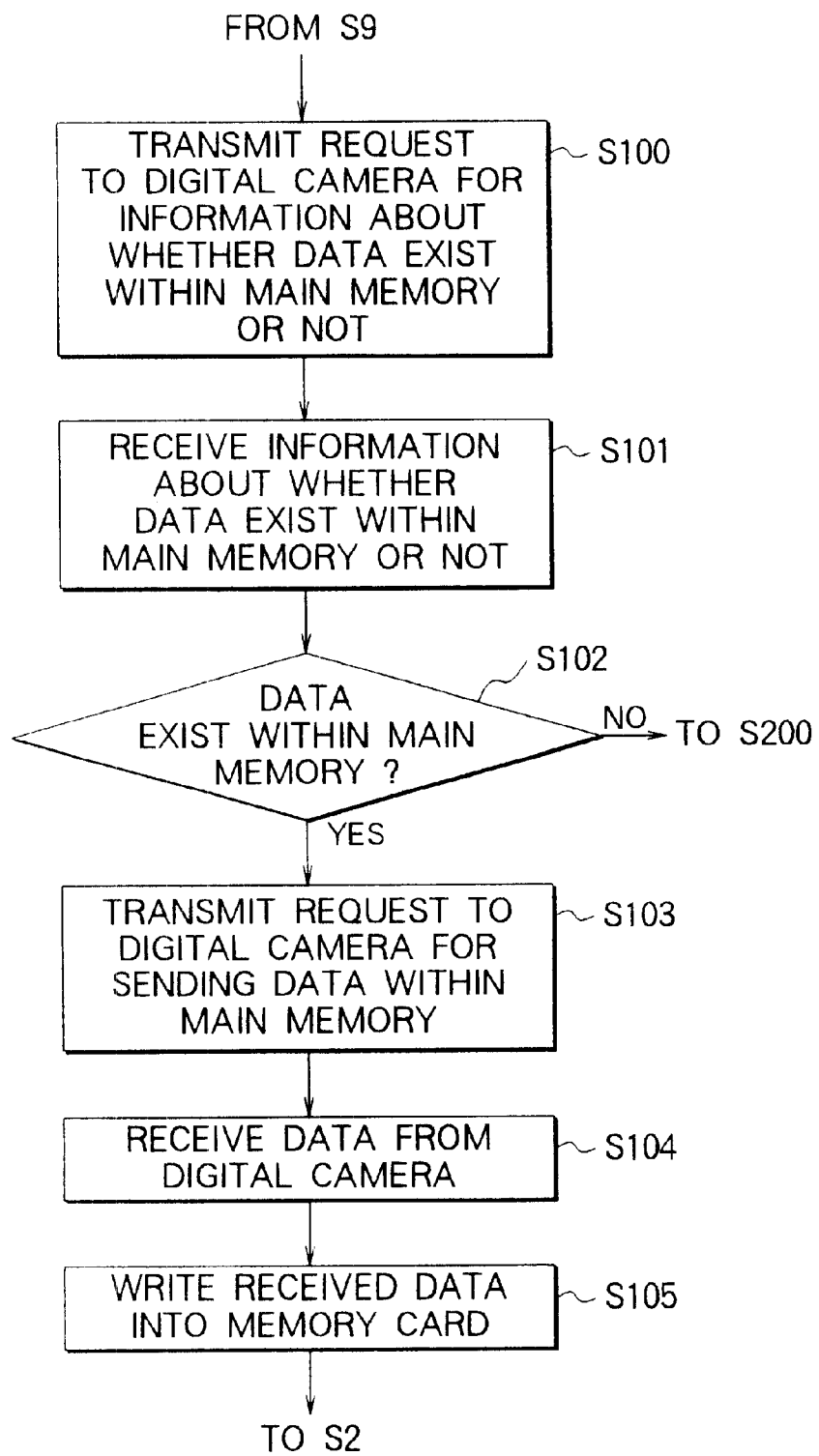
Figure 10:
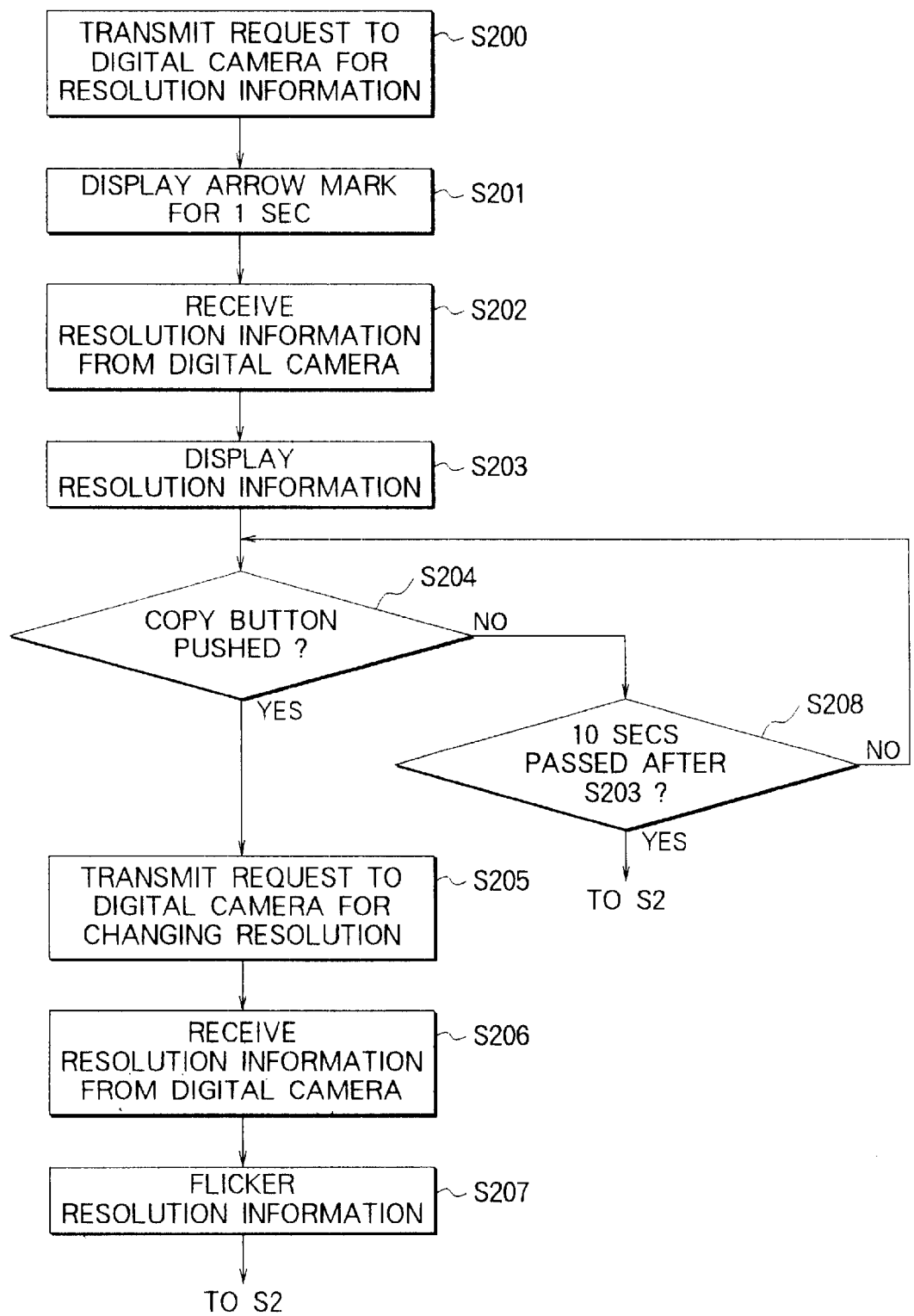

FIGS. 8 to 10 are flow charts for explaining operations of the control section 27a in the external storage device OM. The control section 27a performs operations shown in these flow charts by executing a program including a plurality of instructions written in the ROM 27b.

When the power switch button 3 is pushed down (step 1 (S1)), an electric power is supplied from a power circuit 28 to the control section 27a and the like, whereby the device is actuated on the basis of the program stored in the ROM 27b of this device.

When the memory card 5 is placed within a cavity 5b of the external storage device, a non-depicted sensor detects information about the existence of the memory card 5. This sensor is connected to the control section 27a, which judges whether the memory card 5 is placed within the cavity 5b or not (step 2 (S2)). When it is judged that the memory card 5 is not inserted, the control section 27a causes the display 4 to show information about the nonexistence of the memory card 5 as "NO CARD" (step 11 (S11)). Here, when it is judged that the memory card 5 is inserted, the control section 27a causes the display 4 to show a card icon 4a depicted in FIG. 4.

The control section 27a judges whether the external storage device OM is connected to the digital camera OM or not (step 3 (S3)). Specifically, this judgment is effected as it is judged whether the terminal 7 of the external storage device OM is connected to the terminal 29 of the digital camera CA or not. When it is judged that the external storage device OM is not connected to the digital camera CA, the control section 27a causes the display 4 to show information about this unconnected state as "NO CON" (step 12 (S12)).

When it is judged that the external storage device OM is connected to the digital camera CA, the control section 27a detects the available space on the memory card 5 (step 4 (S4)). Then, the control section 27a causes the display 4 to show information about thus detected available space on the memory card 5 in terms of percent as depicted by an indicator 4b of FIG. 4 (step 5 (S5)).

Further, the control section 27a detects the number of image data files within the memory card 5 (step 6 (S6)). Then, the control section 27a causes the display 4 to show information about thus detected number of image data files as depicted by an indicator 4c of FIG. 4 (step 7 (S7)). Also, the control section 27a judges the battery voltage and causes the display 4 to show information about the battery voltage as depicted by an icon 4d of FIG. 4. When the battery voltage is sufficient for driving the external storage device OM, regions 4e and 4f are lighted. When the battery voltage is insufficient for continuously driving the external storage device OM for at least 30 minutes, the region 4e of the icon 4d is not lighted while the region 4f is lighted. Also, when the battery voltage is insufficient for driving the external storage device OM, the icon 4d is not lighted.

Namely, according to orders from the control section 27a, the display 4 indicates information about image data within the memory card 5, information about the battery voltage, and the like.

Figure 4:
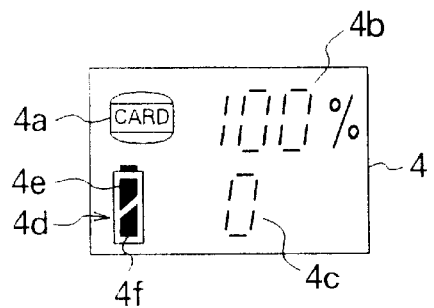
FIG. 4 is an explanatory view for explaining an indicator on a liquid crystal display.

More specifically, in the state where no image data are stored in the digital camera CA, when the external storage device OM and the digital camera CA are connected to each other by way of the cable 10 and both their power supplies are turned on, information depicted in FIG. 4 is shown on the LCD 4. Namely, the upper region 4b of the LCD 4 indicates the capacity recordable within the memory card 5 in terms of %, while its lower region 4c displays the recorded image data within the memory card 5 in terms of the number of shots. Since no image data are stored within the memory card 5, the upper region 4b and lower region 4c of the LCD 4 show characters of 100% and 0, respectively.

Then, the control section 27a judges whether the all-erase button 9 is pushed down or not (step 8 (S8)). When it is judged that the all-erase button 9 is pushed, the control section 27a erases the data within the memory card 5 (step 13 (S13)).

When it is judged that the all-erase button 9 is not pushed, the control section 27a judges whether the copy button 8 is pushed or not (step 9 (S9)).

When it is judged that the copy button 8 is not pushed, the control section 27a judges whether the power button 3 is pushed or not (step 10 (S10)). When it is judged that the power button 3 is pushed, the control section 27a stops supplying the electric power from a non-depicted battery (step 14 (S14)).

When it is judged that the power button 3 is not pushed, the control section 27a judges whether or not 90 seconds have passed without any button being pushed (step 15 (S15)). When it is judged that 90 seconds have passed without any button being pushed, the control section 27a stops supplying the electric power from the non-depicted battery (step 14 (S14)). When it is judged that 90 seconds have not passed without any button being pushed, the control section 27a re-executes the instruction of step 2 (S2).

In the case where the copy button 3 is pushed at step 9 (S9), the control section 27a transmits, to the digital camera CA, a command requesting information about whether the main memory 21 in the digital camera CA contains image data or not (step 100 (S100)). Thus transmitted command is detected at the control section 15 by way of the transmitting circuit 23 and the communication buffer 22. The control section 15 is operated by the program including the instruction written in the ROM 16. When the control section 15 of the digital camera CA receives the above-mentioned command, it detects the information about whether image data exist within the main memory 21 or not, and transmits thus detected information to the external storage device OM. Accordingly, the control section 27a of the external storage device OM receives the information about whether image data exist within the digital camera CA or not (step 101 (S101)).

From thus received information, the control section 27a judges whether image data exist within the digital camera CA or not (step 102 (S102)). When it is judged that image data exist within the digital camera CA, the control section 27a transmits, to the control section 15 of the digital camera CA, a command requesting transmission of the image data within the main memory 21 (step 103 (S103)). Receiving this request for transmitting the image data, the control section 15 of the digital camera CA transmits the image data within the main memory 21 to the control section 27a of the external storage device OM. Receiving the image data (step S104 (S104)), the control section 27a writes thus received image data into the memory card 5 (step 105 (S105)). In other words, the control section 27a stores the memory card 5 with the image data transmitted to the control section 27a from the main memory 21 of the digital camera CA.

Namely, in the state where image data are stored in the digital camera CA, when the external storage device OM and the digital camera CA are connected to each other by way of the cable 10, and the copy button 8 in the operating section CP is then pushed down, the control section 27a of the external storage device OM transmits a control signal corresponding to copying, by way of the transmitting and receiving circuits 26 and 23, to the communication buffer 22. The control section 15 of the digital camera CA detects the control signal transferred to the communication buffer 22, and the instruction for the copying mode is executed in response to this control signal.

The instruction for the copying mode is also stored within the ROM 16. In the copying mode, the control section 15 reads out the image data within the main memory 21, temporarily stores thus read-out data together with control codes such as header and trailer including a flag sequence added thereto, and transfers thus stored data to the external storage device OM by way of the transmitting and receiving circuit 23. While performing error check of thus transmitted data, the transmitting and receiving circuit 26 of the external storage device OM receives the data. The control section 27a reads out thus received data and writes the read-out data into the memory card 5. Here, as mentioned above, the image data stored within the memory card 5 can be erased when the all-erase button 9 in the operating section CP is pushed down.

In the following, an operation for changing the resolution of the digital camera effected by the external storage device OM will be explained. Though the following explanation relates to an example where the photographing mode of the digital camera is changed from a high resolution mode allowing 8 shots to be photographed to a low resolution mode allowing 16 shots to be photographed, the reverse change can be effected in a similar manner.

When it is judged at step 102 (S102) that no image data exist within the main memory 21, the control section 27a transmits, to the digital camera CA, a command requesting information about resolution (step 200 (S200)). It takes about 0.5 second for the digital camera CA to respond to this command. Accordingly, the control section 27a causes the display 4 to show an arrow mark such as that depicted in FIG. 5 for one second (step 201 (S201)).

Receiving the command for requesting the resolution information, the control section 15 of the digital camera CA transmits the resolution information (whether the resolution is high or low) to the control section 27a of the external storage device OM. Accordingly, the control section 27a receives the resolution information from the digital camera CA (step 202 (S202)). Receiving the resolution information from the digital camera CA, the control section 27a causes the display 4 to show thus received resolution information as depicted in FIG. 6 (step 203 (S203)).

Figure 5:
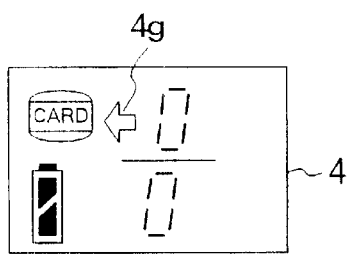
FIG. 5 is an explanatory view for explaining an indicator on the liquid crystal display.
Figure 6:
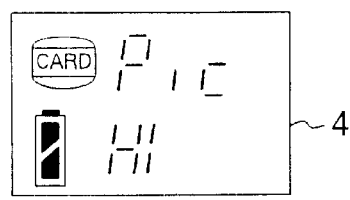
FIG. 6 is an explanatory view for explaining an indicator on the liquid crystal display.

More specifically, in the state where no image data exist within the main memory 21, when the copy button 8 is pushed down, the information in FIG. 5 is lighted for about one second in the LCD 4, and then the information in FIG. 6 is displayed there. Namely, in this state, when the copy button 8 of the operating section CP is pushed down (step 9 (S9)), the control section 27a of the external storage device OM transmits a control signal corresponding to an operation for inspecting the state of the main memory 21 to the communication buffer 22 by way of the transmitting and receiving circuits 26 and 23 (step 200 (S200)). The control section 15 of the digital camera CA detects the control signal transferred to the communication buffer 22 and transmits, to the control section 27a of the external storage device OM, information about the photographing mode which has already been set within the ROM 16 in response to this control signal. Receiving this photographing mode (high-resolution mode) information (step 202 (S202)), the control section 27a of the external storage device OM causes the LCD 4 to show this information (step 203 (S203)).

The control section 27a of the external storage device OM judges whether the copy button 8 is pushed down or not (step 204 (S204)). When it is judged that the copy button 8 is not pushed, the control section 27a judges whether 10 seconds have passed after step 203 (S203). When it is judged that 10 seconds have not passed after step 203 (S203), the control section 27a repeats the operation of step 204 (S204); whereas, when it is judged that 10 seconds have passed, the control section 27a repeats the operation of step 2 (S2).

Figure 7:
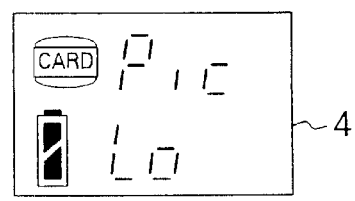
FIG. 7 is an explanatory view for explaining an indicator on the liquid crystal display.

Namely, the LCD 4 shows this resolution information for a predetermined period (10 seconds) as depicted in FIG. 6 (step 203 (S203)). During this display period, when the copy switch 8 is continuously pushed down, as noted above, the control section 27a of the external storage device OM transmits, to the digital camera CA, a control signal for changing the setting of the resolution within the ROM 16 of the digital camera CA (step 205 (S205)). The control section 15 of the digital camera CA receiving this signal changes the photographing mode (function mode) within the ROM 16 from the high resolution to the low resolution, detects whether the photographing mode is changed or not, and, after confirming that the photographing mode has been changed, transmits thus confirmed information to the control section 27a of the external storage device OM. When the control section 27a of the external storage device OM receives this information (step 206 (S206)), it causes the LCD 4 to show the information about this change as depicted in FIG. 7 (step 207 (S207)). This display is effected for three seconds with flickering. Thereafter, the LCD 4 shows the information in FIG. 4 again.

Thus, as the functional setting of the digital camera CA is performed by the external storage device OM, the number of parts such as switches in the main body of the digital camera CA can be reduced, thereby lowering the manufacturing cost of the digital camera CA. Also, as such functional setting of the digital camera CA is effected not by a large host computer but by an external storage device having a size which can be held with one hand, the convenience for its user can be remarkably improved.

As explained in the foregoing, when the functional setting of the digital camera is effected by the external storage device separated from the digital camera, a quite convenient digital camera can be provided. Here, while modes of resolution are switched by the external storage device OM as the photographing mode in the foregoing embodiments; photographing modes such as flash lighting modes (strobe lighting mode and single lighting mode) and autofocus modes (spot autofocus, multi-autofocus, and macro-autofocus) of the digital camera may also be switched by the external storage device OM.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 33852/1996 filed on Feb. 21, 1996 is hereby incorporated by reference.

What is claimed is:

1. An external storage device connectable to a digital camera by a cable, said digital camera including a first memory for storing image data, a second memory for storing image data converted from the image data in said first memory by a predetermined resolution and a third memory including a program for controlling said image-data-conversion by said predetermined resolution, comprising:

a hand-held size housing that can accommodate a recording medium;

a single copy button provided on said housing;

an LCD provided on said housing; and a control section, wherein, when said copy button is pushed once, said control section sends a first request to said digital camera for information about whether image data exists within said second memory, when said digital camera sends back the information indicating that there is image data within said second memory in response to said first request to said control section, said control section sends a second request to said digital camera requesting transmission of the image data within said second memory to said recording medium, when said digital camera sends back the information indicating that there is no image data within said second memory in response to said first request, said control section sends a third request to said digital camera requesting information about said predetermined resolution set in said third memory, when said digital camera sends back the information regarding the predetermined resolution set in said third memory to said control section, said LCD displays the information regarding the predetermined resolution, when said copy button is pushed within the period that said LCD displays the information regarding the predetermined resolution, said control section sends a fourth request to said digital camera requesting the resolution set in said third memory be changed, thereby copy and resolution change actions are achieved by using said single copy button, and said external device is in a hand-held size.

2. An external device according to claim 1, in which all of the buttons on said housing consist of:

said copy button;

a power button operable to supply power to said control section; and an erase button operable to erase said recording medium.

3. A system comprising said external device and said digital camera as defined in claim 1.

* * * * *